United States Patent [19]

Rosenbaum et al.

[11] 4,001,820
[45] Jan. 4, 1977

[54] MULTIPLE HYPERPLANE RECOGNIZER

[75] Inventors: Erik Rosenbaum, Randallstown; Edward G. Klimchak, Owings Mills, both of Md.

[73] Assignee: The United States of America as represented by the Secretary of the Navy, Washington, D.C.

[22] Filed: Aug. 5, 1971

[21] Appl. No.: 174,573

[52] U.S. Cl. .................. 343/5 SA; 343/17.1 R; 343/100 CL
[51] Int. Cl.² .......................................... G01S 7/66
[58] Field of Search ......... 343/5 SA, 17.1, 100 CL; 324/77 R, 77 H

[56] References Cited
UNITED STATES PATENTS

| 3,270,188 | 8/1966 | Ares | 343/102 X |
| 3,391,403 | 7/1968 | Phillips, Jr. | 343/17.1 R |
| 3,483,561 | 12/1969 | Procopio, Jr. | 343/100 CL |
| 3,668,702 | 6/1972 | Jones | 343/17.1 R |

Primary Examiner—T.H. Tubbesing
Assistant Examiner—S. C. Buczinski
Attorney, Agent, or Firm—R. S. Sciascia; Q. E. Hodges

[57] ABSTRACT

The hyperplane recognizer identifies a target by recognizing its radar signature and separating this signature from background clutter and the signatures of other identifiable targets. The signal is passed through a tapped delay line, with each tap being weighted. As the radar signal travels down the delay line it is scaled by the weights. The weighted signal is summed, and the summed signal is above a defined threshold if a sought target is recognized and below if not.

7 Claims, 1 Drawing Figure

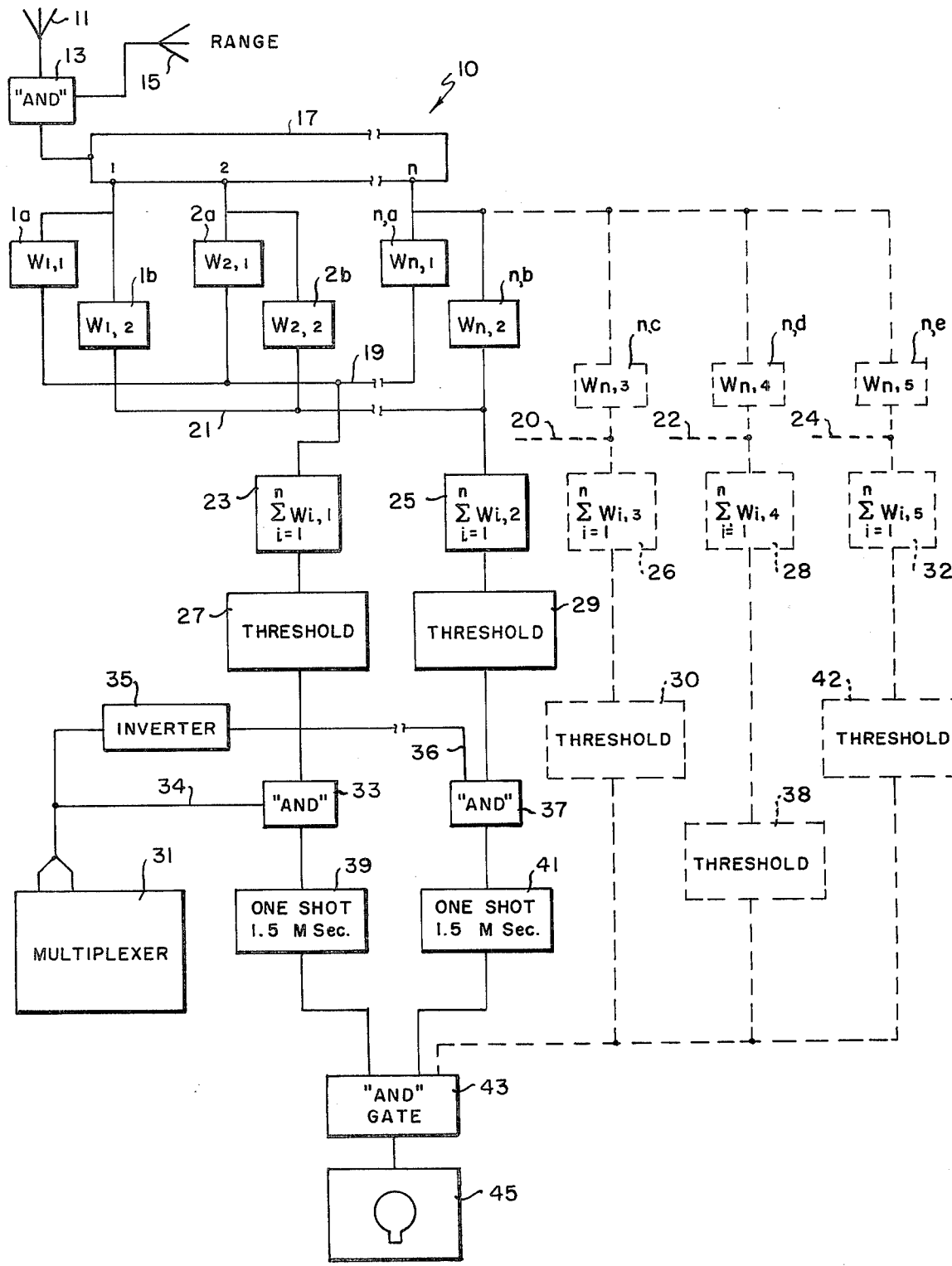

MULTIPLE HYPERPLANE RECOGNIZER

DESCRIPTION OF THE PRIOR ART

Pattern recognition is generally defined as a machine system for adaptive information processing. The systems shown in the prior art are correlation systems wherein known information is compared with information that is being acquired. This system is limited to recognition of a known item. The correlation system uses a delay line with specified weights at each delay line tap as does the applicant. These delay line weights are matched filters designed to duplicate the replica or known item and match the information being acquired to the replica exclusively.

The technique of the present invention differs from the prior art in that a learning algorithm is used to tentatively gather statistical data from item patterns which are sought to be recognized and those item patterns which are known and recognizable but difficult to distinguish from the sought pattern.

While the concepts shown in the prior art are capable to selecting a pattern A from amongst the patterns A, B, C by individually recognizing A, the learning algorithm and the scheme of this invention offers a refinement over the prior art in that it permits recognition of A while also recognizing B and C, and permitting rejection of B and C from A.

This refinement enables the pattern recognizer to more closely distinguish between the item pattern sought and other patterns which are not sought but are so close in pattern recognition parameters that selection from amongst the sought pattern and the non-sought patterns would be extremely difficult unless both the sought patterns and the other patterns were all recognized and evaluated.

The recognition system of the prior art, described as learning without a teacher is not given to the benefits of the applicants' invention. In the prior art sample patterns of known class identity are presented to the system and the system, rather than relying on man for learning the pattern class definition, as in learning with a teacher, becomes the strategy for how the machine itself will discern the patterns. By processing the sensor outputs for each pattern, the system with a typical basic learning-without-a-teacher strategy makes uses of the fundamental tenant that patterns belonging to the same class have fewer mutual differences than patterns not belonging to the same class. In the prior art there is no clear demarkation between a learning phase and the recognition phase as patterns of unknown identity are continually being presented and a machine continually updates its internal definition of pattern classes during its operating time.

Where the radar antenna is oriented to more than one polarization or direction, the prior art was unable to process the distinctly polarized return signals in separate channels and to combine the signals in a logic arrangement so that signature recognition reliability was increased.

This invention can produce initial recognition signals for each direction or polarization of the antenna and then may process them through a logic adder to produce a final recognition signal when patterns in each polarization are successively recognized, thereby increasing recognition reliability.

SUMMARY OF THE INVENTION

The multiple hyperplane recognizer is a radar signature recognizer where the term hyperplane is defined as means to partition a vector space into two parts. The radar return signal is returned to a tapped delay line. A series of weights are attached to each tap in the delay line and these weights scale the signal at each tap point. The weights connected to each tap are determined in accordance with the learning algorithm carried out by a computer.

The learning algorithm itself involves acquiring feature data from known classes of radar signatures. The weights are initially chosen and a pattern is selected for training the computer. New weights values are then recalculated and this process is continued until a minimum number of errors are detected in recognizing and selecting the desired pattern from among other patterns in the radar signature.

The scaled signals from each delay line tap are summed and sent to a threshold device. In the event the sought recognized target signature is contained in the radar signal the threshold device will be triggered generating a signal to indicate the presence of the sought signature. The threshold signal is then "and" gated with other threshold device signals to generate an output indicating the presence of the pattern.

Accordingly, it is an object of this invention to identify one object from other objects by their radar signature.

It is a second object of this invention to distinguish between objects recognized and having definite radar signatures.

It is a third object of this invention to trigger a signal denoting recognition when a particular object is recognized.

BRIEF DESCRIPTION OF THE DRAWING

The FIG. shows in schematic form the recognizer system including an antenna having at least two directions of polarization, a tapped delay line, weighting means, summation amplifiers, and threshold devices and "and" gating of the threshold signal.

DESCRIPTION OF THE INVENTION

The system shown designated generally by numeral 10, comprises a radar antenna 11, with at least two directions of polarization, connected to an "and" gate 13. A range gate signal 15 is inputted to the "and " so that only targets lying within certain range limits are processed for signature recognition. A delay line 17, connected to the output of "and" gate 13, has a number of taps $n$ spaced along its electrical length. The number of taps depends upon the number of selected item parameters or item features used in the computerized learning algorithm. The tap spacing is a function of the size of a target to be recognized and for proper recognition the number of taps may equal 20 and the spacing between taps may be 5 nanoseconds.

The delay line may consist of passive devices such as inductances and capacitances. For this reason it is not considered necessary to further describe the delay line. Connected to each tap, tap number 1 for example, are weights $1a$ and $1b$. The weights may be passive devices (i.e., impedances) which scale the signal output of the respective delay line tap. As shown in the FIGURE, each tap output is scaled by one or a plurality of weighting devices and each weighting device from a single tap is connected to a respective bus, (i.e., weight 1a is connected to bus 19, weight 2a is connected to but 19, etc., weight 1b is connected to bus 21, weight 2b is connected to bus 21, etc.).

Connected to each bus is a summation amplifier, summation amplifier 23 being connected to bus 19 and summation amplifier 25 being connected to bus 21. Each summation amplifier sums the signals scaled by the respective weighting device connected to its respective bus.

The expressions which describe the inputs to the threshold device from the summation amplifier 23 nd 25 are:

$$\sum_{i=1}^{n} W_i,1 \, f_{n,1} \text{ for threshold 23,}$$

and $$\sum_{i=1}^{n} W_i,2 \, f_{n,2} \text{ for threshold 25}$$

where the $W$'s are weights, the $f$'s are the radar signals, and values of the weights $W_{1,1}$ through $W_{n,2}$ and $W1,2$ are derived from the learning algorithm carried out by a computer.

The threshold device is triggered to emit a signal when the output of the respective amplifier 23 or 25 is above a "recognition level". The recognition level is associated with each series of weighting devices 1a-na and 1b-nb in the following manner.

The weights are specifically chosen so that the signature pattern of a sought item to be recognized and identified from among a group of recognizable signature pattern will result in a signal level from the respective summation amplifier greater than the established threshold. The summation signal will then trigger the threshold to emit a signal only when the radar signature contains the sought signal corresponding to the particular object to be identified.

A multiplexer 31 is directly connected to "and" gate 33 which is connected to the threshold device 27. Multiplexer 31 is additionally connected through inverter 35 to "and" gate 37 which is connected to threshold device 29.

The multiplexer frequency is set at half the Radar Pulse Repetition Rate (PRF) since there are two polarizations of the antenna. The multiplexer is timed keyed to the antenna so that "and" gate 33 receives an enabling signal at input 34 during the interval when the antenna 11 is in a first receiving polarization. During this interval, inverter 35 maintains "and" gate 37 off. When the antenna is in the second receiving polarization, inverter 35 produces an enabling signal at input 36 of gate 37. During this second interval, gate 33 is maintained off by the multiplexer output signal. "And" gate 33 produces an output signal only during the first interval corresponding to the antenna being in the first receiving polarization, when the enablng signal is received on input 34 and a threshold signal is received from threshold device 27. Similarly, "and" gate 37 produces an output signal only during the interval when an enabling signal is received at input 36 and a threshold signal is received from threshold device 29.

The outputs of each of the "and" gates are inputted to respective one shot multivibrators 39 and 41. These multivibrators stretch the time duration of the pulse output of the "and" gates so that a signal appearing at the output of one "and" gate is retained through the time interval the second "and" gate is enabled. If the PRF rate is 1 millisecond, the multivibrator outputs may be 1.5 milliseconds.

"And" gate 43 produces a signal only when signals appear on all of its inputs. The effect of triggering the one shot multivibrator with the output of each of the "and" gates 33 and 37 to produce time coincident inputs to "and" gate 43 is an increase in the system's ability to recognize and to signal the appearance of a radar signature corresponding to a sought item at indicator 45 with less error.

DERIVATION OF WEIGHTS

Basically the values of the weights W1,1 through W$n$,1 and W1,2 through W$n$,2 are derived in a learning algorithm carried out by a computer. The first series of weights W1,1 through W$n$,1 are computed by training one polarization of the radar signal on the target. Training is continued until a minimum number of errors are detected. The second polarization of the radar signal provides the second series of weights W1,2 through W$n$,2 in a like manner.

Each object scanned by a radar signal transmits back to the radar antenna a unique radar signatures. The object of the recognizer as stated above is to identify a particular radar signature from among a group of individually unique radar signatures. This may be likened to selecting the radar signature for a 747 airplane from among a group of airplanes including the 747, a piper cub, a 707, and a DC 3. The routine for deriving the weights first requires that a set of unique number of data features be chosen to identify the 747 and each of the other planes within the above mentioned group. Included in these sets of data features might be speed, cross section, glide paths, direction, etc.

A threshold constant is chosen representing a hyperplane and divides the feature composites of the 747 from the feature composites of the other aircraft. The equation of this hyperplane may be stated as follows:

$$S = W1f1 + W2f2 + \ldots Wnfn + W_0 = 0 \tag{1}$$

where $W_0$ is the threshold constant, and $W1, W2, \ldots Wn$ are weights chosen so that $$S = W_0 + \sum_{i=1}^{n=40} Wi, fi = 0 \tag{2}$$

and where the number of features ($fi$) associated with each signature airplane is, in this example, 40.

A routing deriving the appropriate weights (WI's) is called a training routine in which radar signatures comprising known data features of known items are processed according to the algorithm to derive the weights necessary to distinguish the 747 signature from the other airplane signatures or more generally to distinguish the recognized item sought from among other items which are recognizable, but not sought.

The routine is started by acquiring sets of feature data of known items and choosing an initial value for the weights (for convenience Wi may be initially set equal to zero and $W_0$ may be initially set equal to zero). In the iterative training procedure the weights Wi and $W_0$ are then repeatedly updated so that the final weight values will result in the lowest number of errors in distinguishing the recognized item sought from the other recognized items within the group. The updating of the weights can be represented by the following equations;

$$Wi(\text{new}) = Wi(\text{old}) + Wi(\Delta) \quad (3a)$$
$$W_0(\text{new}) = W_0(\text{old}) + W_0(\Delta) \quad (3b)$$

where $Wi(\Delta)$ and $W_0(\Delta)$ are the changes to $W_0$ and $Wi$ resulting from a preceeding training iteration.

$Wi$ (new) can be then expressed as:

$$Wi(\text{new}) = Wi(\text{old}) + \eta f_i \rho(f_i) - \left[ W_0 + \sum_{i=1}^{n} W_i f_i \right] \quad (4)$$

and the $W_0$(new) is expressed as:

$$W_0(\text{new}) = W_0(\text{old}) + \eta \rho(f_i) - \left[ W_0 + \sum_{i=1}^{n} W_i f_i \right] \quad (5)$$

In equations (4) and (5) $\eta$ is a convergence factor and $\rho(f_i)$ an assigned value, either +1 or −1; +1 corresponding to a set of features describing the known item sought and −1 corresponding to the features of a recognized item which is from the training group but not sought.

The training routine for deriving the values of the weights is now described.

Each item to be recognized has a unique radar signature comprising a unique group of features. As a first step, A, unique feature data relating to respective groups of known items is compiled.

Step B: the values of $Wi$ and $W_0$ are initially set at zero. Although $Wi$ and $W_0$ could initially be set at other values, zero is chosen for its convenience.

Step C: A signature pattern of either a sought item or a non-sought item is selected for training. Step D:

$$S = W_0 \pm \sum_{i=1}^{n} W_i F_i$$

is computed using the set of values initially chosen of $Wi$ and $W_0$.

Step E: $\rho$ is set to +1 if the features chosen correspond to a sought item and −1 if the features chosen correspond to an item not sought.

Step F: The weight set is updated by computing the new $W$ using equation (4) and new $W_0$ using equation (5). Then, repeat steps C through E, substituting the newest values of $Wi$ and $W_0$ for the values used in step B of the last preceeding iteration.

Step G: Steps C through E are repeated until all signature patterns compiled for training are used.

Step H: Using the newest weight set derived in the last training iteration of steps C through E, the signature recognition error is ascertained. If this error is sufficiently small, the training iteration is stopped and the last set of weights derived are the weights used in the recognizer, i.e., $Wi,1$ through $Wn,1$.

A second set of weights, $W1,2$ through $Wn,2$ can be computed in the same manner by utilizing a second set of unique compiled feature data.

The algorithm for deriving the system's weights is known as the least means square algorithm and is set forth in "Proceedings of the IEEE", by George Nagy, vol. 56, No. 5, May 1968, pp. 836–862.

The reliability of recognition may be increased simply by deriving and using additional sets of weights together with the two sets shown in FIG. 1. Each additional weight set may be used with its respective threshold, summer, and "and" gate signal processing system as shown in the Figure. Alternatively, each weight of an additional set of weights (weight sets $Wn,3$; $Wn4$; and $Wn,5$ shown) may be connected, as shown in phantom in the Figure by a bus (busses 20, 22 and 24 shown) to its respective summer (summers 26, 28 and 32 shown) and threshold device (devices 30, 38 and 42 shown) and the output of the threshold devices may be inputted to "and" gate 43 to further increase the reliability of the device.

In addition, where a single antenna polarization is used, the multiplexer, the "and" gates and the multivibrators may be removed from the system and the outputs of the threshold devices may be inputted to "and" gate 43, as shown for devices 30, 38 and 40.

Obviously many modifications and variations of the present invention are possible in the light of the above teachings. It is therefore to be understood that within the scope of the appended claims the invention may be practiced otherwise than as specifically described.

What is claimed is:

1. A multiple hyperplane radar signature recognizer, comprising:
    a delay line;
    said delay line having a series of "N" taps spaced along its electrical length;
    means connected to said taps for scaling the outputs of said taps and generating a signal when said scaled outputs are above a threshold value;
    a plurality of "and" gates connected to said scaling means;
    each of said "and" gates corresponds to a respective antenna polarization;
    means connected to said "and" gates for enabling each said "and" gate for discrete period of time; and
    means connected to the outputs of said "and" gates for indicating the presence of output signals in all of said "and" gates during each "and" gate's respective enabling period.

2. The multiple hyperplane recognizer of claim 1, wherein each said enabling period is time keyed to the radar pulse reptition rate.

3. The multiple hyperplane recognizer of claim 2, wherein each said "and" gate is enabled only when its respective antenna polarization is in the receiving mode.

4. The multiple hyperplane recognizer of claim 3, wherein said means for indicating the presence of output signals includes a plurality of one shot multivibrators connected to each of said "and" gates outputs for stretching the time duration of a signal appearing at an "and" gate output; and
    an "and" gate having inputs connected to each said multivibrator output for producing a signal indicating the presence of a radar signature corresponding to a sought item.

5. The multiple hyperplane recognizer of claim 4, wherein:
    said enabling means is a multiplexer connected to an input of each of said "and" gates; and said multiplexer enabling each of said "and" gates during said discrete period of time.

6. The hyperplane recognizer of claim 5, wherein:
said scaling means connected to said taps includes a plurality of weighting devices and a plurality of threshold devices, each said threshold device being connected to a delay line tape through a weighting device and having an output connected to a respective "and" gate.

7. The multiple hyperplane recognizer of claim 6, wherein said weight values are determined according to the least means square algorithm.

* * * * *